March 2, 1965     J. F. CHRISTOPHER     3,171,951
CORRECTED FLOW VOLUME COMPUTER Filed Nov. 25, 1960     3 Sheets-Sheet 1

John F. Christopher
INVENTOR.

BY *Clarence A. O'Brien*
*and Harvey B. Jacobson*
Attorneys

March 2, 1965   J. F. CHRISTOPHER   3,171,951
CORRECTED FLOW VOLUME COMPUTER
Filed Nov. 25, 1960   3 Sheets-Sheet 2
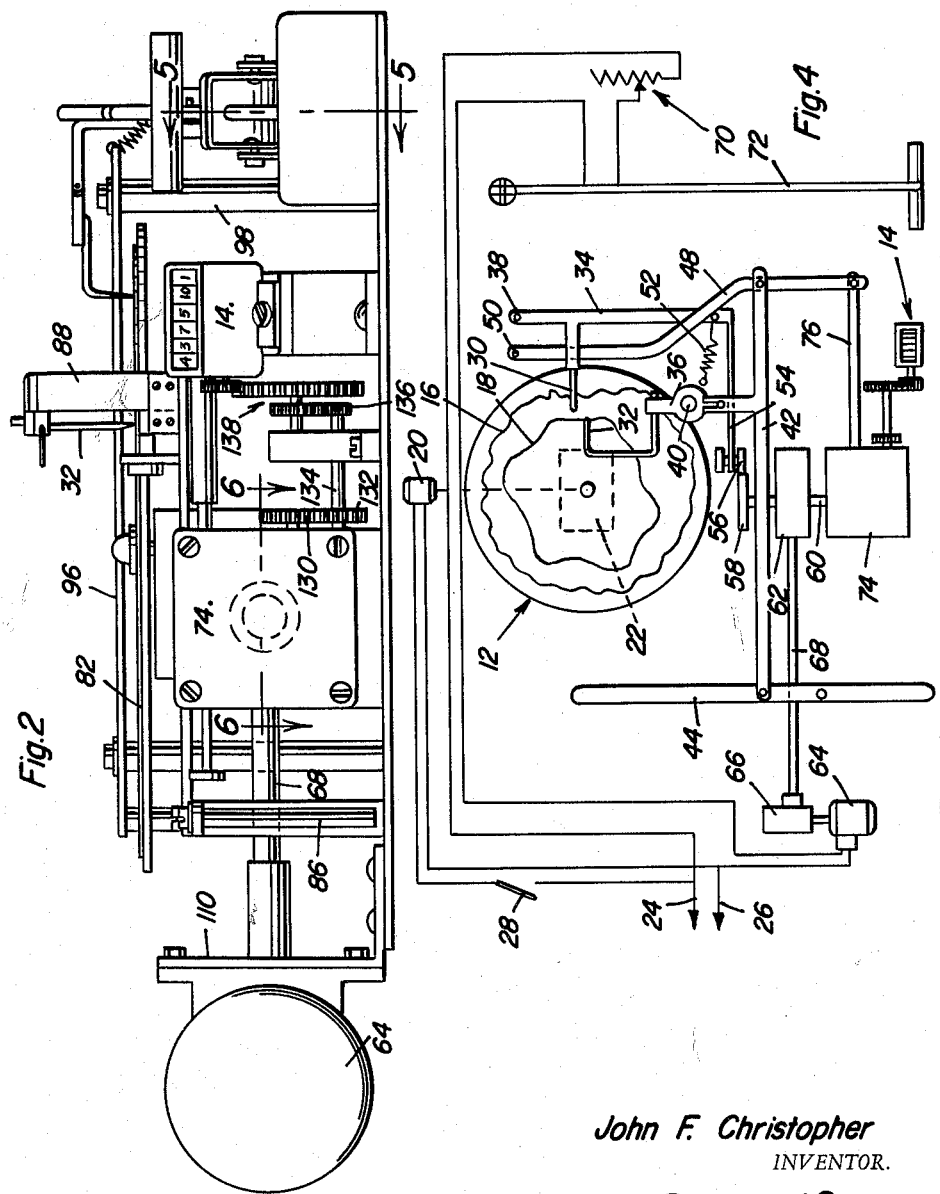
John F. Christopher
INVENTOR.

March 2, 1965  J. F. CHRISTOPHER  3,171,951
CORRECTED FLOW VOLUME COMPUTER
Filed Nov. 25, 1960  3 Sheets-Sheet 3
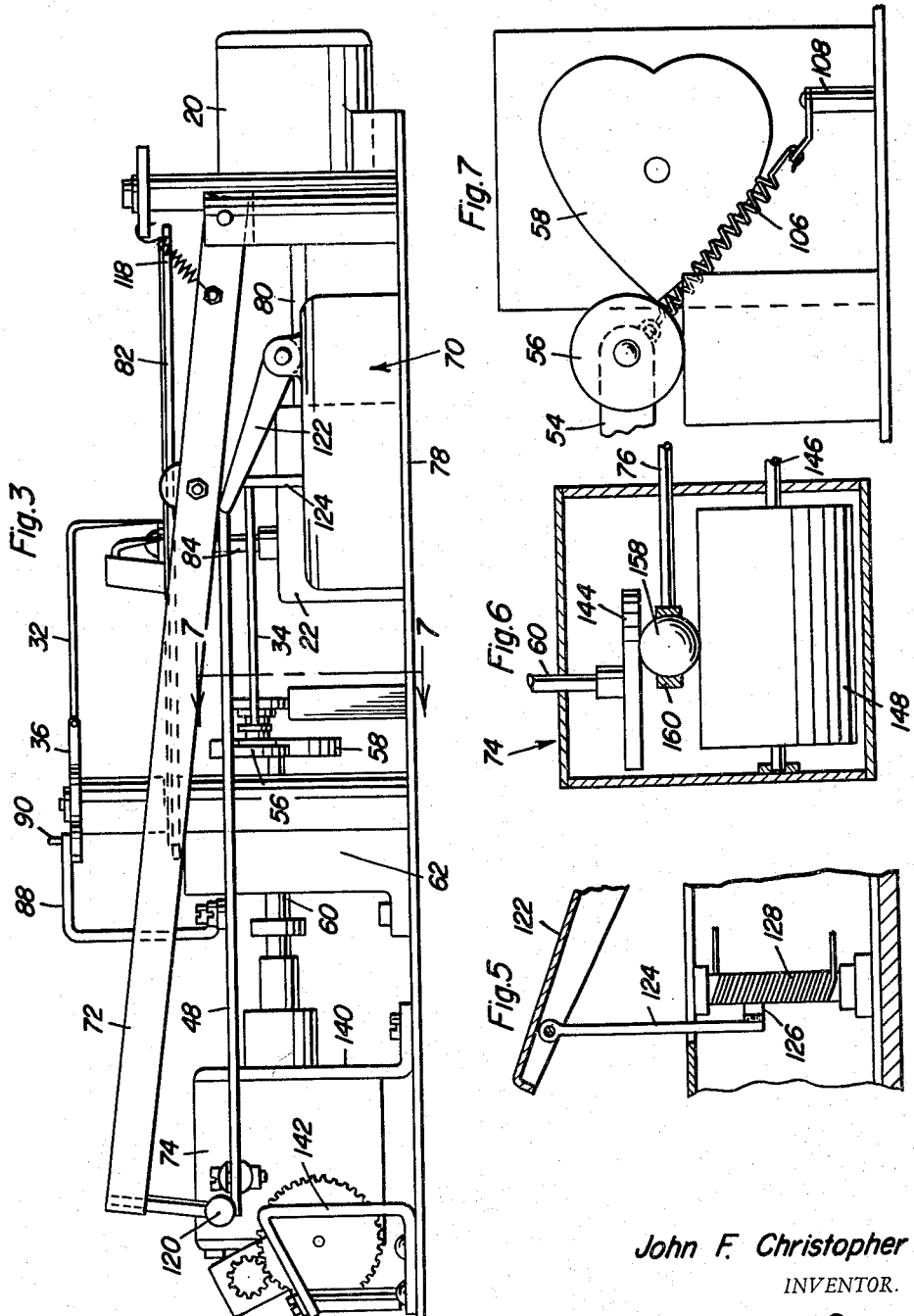
John F. Christopher
INVENTOR.

# United States Patent Office 3,171,951
Patented Mar. 2, 1965

3,171,951
CORRECTED FLOW VOLUME COMPUTER
John F. Christopher, 1313 Timbergrove Drive,
Knoxville, Tenn.
Filed Nov. 25, 1960, Ser. No. 71,714
8 Claims. (Cl. 235—61.6)

This invention relates to a mechanism for computing corrected total volume consumption of gas from a gas meter chart and more particularly to a mechanism for computing total corrected gas consumption from meter charts of volume-pressure type meters in common use as distinguished from differential and absolute static pressure charts obtained from orifice type meters.

The computing mechanism of this invention is particularly designed for converting into useful form the data recorded on a flow meter chart taken from a volume-pressure type of flow meter. In this type of flow meter, the actual volumetric gas displacement per unit time is measured by the meter and is depicted on the meter chart by a volume curve representing one variable function of time. The total volume of gas passing through the meter may thereby be computed from the curve on the meter chart which reflects volumetric displacement through the meter over a given period of time. It will, however, be appreciated that the total volume of gas consumed that may be computed from such a volume curve must be corrected in accordance with the static pressure of the gas passing through the meter. Accordingly, the meter also measures instantaneous static pressure of the gas flow through the meter. Accordingly, the meter chart also includes an instantaneous static pressure curve for the period of time covered on the chart representing a second variable function of time. From the foregoing, the usefulness of the computer mechanism of this invention will be apparent inasmuch as the mechanism may be utilized in connection with the aforementioned meter chart to simultaneously trace the volume and pressure curves thereon to thereby compute the total gas volume flow during the time covered by the flow meter chart corrected for the variations in static pressure.

It is therefore a primary object of this invention to provide a flow volume computer mechanism which will provide the total volume of gas consumed corrected for variations of static pressure thereof from the graphical information recorded on the meter chart of the flow meter.

Another object of this invention is to provide a flow volume computer mechanism in which a circular flow meter chart is mounted and rotated in timed relation to the time covered by the volume and pressure curves on the chart, the computer mechanism also including volume curve and static pressure curve tracers with the volume tracer movement being controlled by cyclic displacement thereof by a volume reference motor, the speed of which is controlled by a manually operable rheostat so as to vary the cyclic movement of the volume tracer enabling the operator to trace the volume curve. The static pressure curve tracer is directly controlled by a manual lever mechanism. The volume motor is drivingly connected to a totalling counter mechanism through a ball and disk type integrator the drive ratio of which is varied by the static pressure tracer so that the totalling counter will indicate a corrected volume quantity from that which would otherwise be indicated from rotation of the volume motor itself.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a front elevational view of the mechanism illustrated in FIGURE 1.

FIGURE 3 is a side elevational view of the mechanism illustrated in FIGURE 1.

FIGURE 4 is a schematic top plan view of the computer mechanism illustrating the operational principles thereof.

FIGURE 5 is a partial sectional view taken substantially through a plane indicated by section line 5—5 of FIGURE 2.

FIGURE 6 is a partial sectional view taken through a plane indicated by section line 6—6 in FIGURE 2.

FIGURE 7 is a partial sectional view taken through a plane indicated by section line 7—7 of FIGURE 3.

Figure 1:
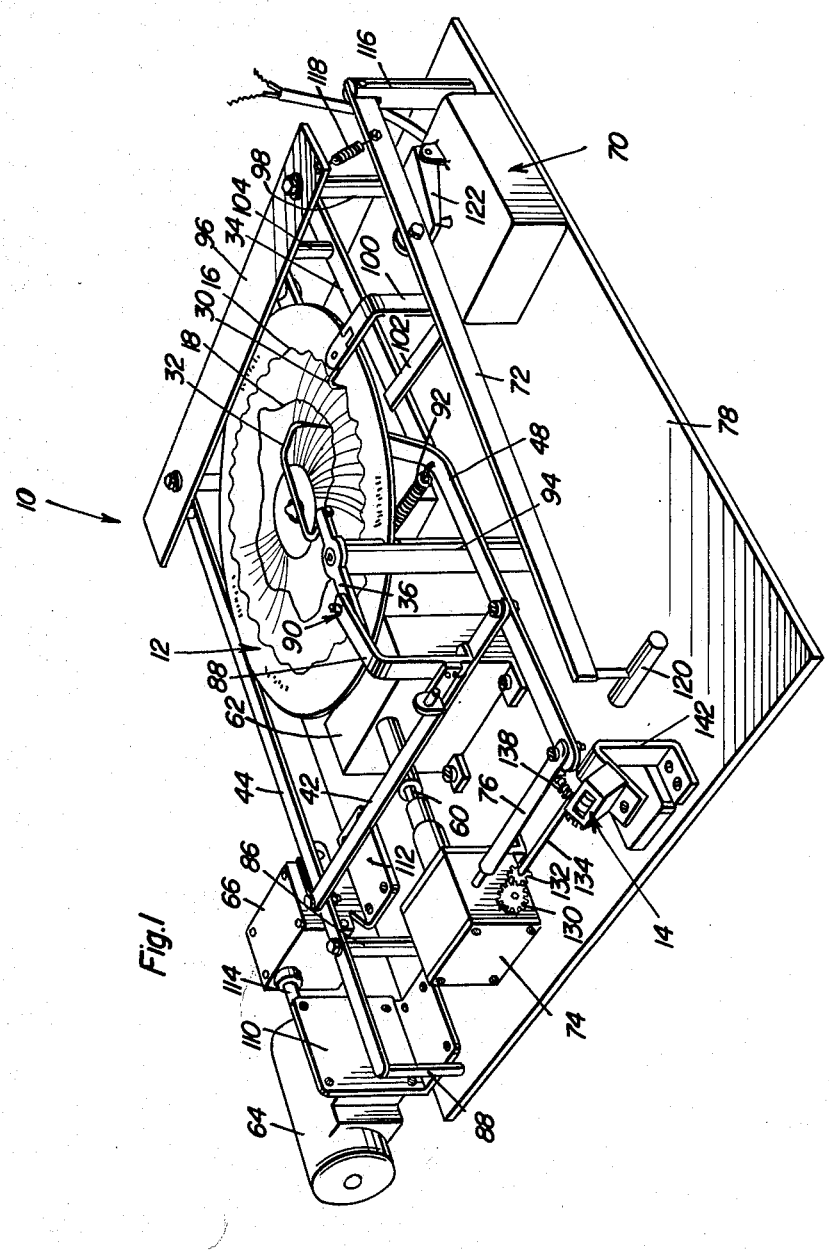
FIGURE 1 is a perspective view of the flow volume computer mechanism made in accordance with this invention.

Referring now to the drawings in detail, FIGURE 1 illustrates more completely the construction of the computer mechanism of this invention which is generally referred to by reference numeral 10. It will therefore be observed that the mechanism 10 has mounted thereon the volume-pressure meter chart 12 from which the information recorded on the chart 12 is converted into the static pressure corrected total volume of gas flow through the meter during the period of time covered on the meter chart 12, which volume quantity is shown on the counter mechanism 14.

Reference is first made to FIGURE 4 in order to describe the operational principles of the computer mechanism. It will therefore be observed in FIGURE 4 that the meter chart 12 includes both a volume curve 16 representing volume fluctuation with time and a static pressure curve 18 representing corresponding instantaneously static pressure fluctuations. Thus, the chart is rotated at a constant speed in timed relation to the time covered by the chart 12 by means of a motor 20. The chart is rotated by means of the motor through a very high reduction ratio of perhaps 120 to 1 through the ratio reducing mechanism 22 as shown in dotted line in FIGURE 4 so as to rotate the chart 12 slowly in order to enable the operator of the computer mechanism to trace the volume and pressure curves 16 and 18. It will therefore be noted that the motor 20 may be energized by current from power lines 24 and 26 which are connected thereto through a switch device 28. Operation of the motor 20 will be independent of the other motor mechanisms in the computer mechanism.

It will further be observed from FIGURE 4, that the volume curve and pressure curve are respectively traced i.e. followed by means of stylii 30 and 32 which are mounted on tracing levers 34 and 36 respectively. The levers 34 and 36 are therefore pivotally mounted on the computer frame at pivot points 38 and 40. The pressure curve tracing lever 36 is connected by a pin and slot connection to a link member 42 one end of which is pivotally connected to a manual operating lever 44 while the other end of the link member 42 is pivotally connected to a correction control lever 48 pivotally mounted on the frame at one end at pivot point 50, and biased to one position by spring 52. Accordingly, by manual operation of the lever 44, link 42 will pivotally displace the pressure curve tracing lever 36 to thereby displace the stylus 32 for tracing the pressure curve 18 as the chart 12 is rotated thereunder. Pivotal displacement of the lever 36 by the link member 42 will also pivotally displace the control lever 48 so that linear displacement in both directions of stylus 32 by lever 44 produces a variable input which reflects static pressure as a function of time.

It will be observed that the volume tracing stylus 30 mounted on the lever 34 must also be displaced in order to trace the volume curve 16 on the chart 12. A follower arm 54 is connected to one end of the lever 34 opposite the pivot point 38, the arm 54 having a follower element 56 mounted thereon. The follower element 56 cooperates with a cam member 58 which is fixed to one end of an output shaft 60 from a gear reducer mechanism 62. A volume reference motor 64 is therefore drivingly connected through a drive mechanism 66 to the input shaft 68 of the gear reducer 62 so as to rotate the output shaft 60 thereof at the proper speed. Accordingly, rotation of the shaft 60 will rotate the cam member 58 in one rotational direction so as to impart cyclic pivotal movement to the tracing lever 34, the amplitude of which represents the volume of fluid cyclically transferred through the meter at a rate of movement varied in accordance with the volumetric flow rate of the fluid, to thereby correspondingly displace the volume curve tracing stylus 30. It will be noted therefore that the motor 64 for accomplishing the cyclic displacement of the stylus 30 is energized by electrical connection to the power lines 24 and 26 and through a variable rheostat mechanism 70 by means of which the speed of the motor 64 may be varied in order to vary the cyclic movement of the volume tracing stylus 30 and thereby enable one to trace the volume curve 16. A manual rheostat operator 72 is therefore provided in order to control the speed of the volume motor 64 through the rheostat 70. The shape of the cam 58 as seen in FIGURE 7 is such that a constant volumetric flow would cause the displacing volume of fluid passing through the meter to record a curve 16 that would be traced by displacement of stylus 30 through cam 58 driven at a constant speed. Fluctuations from the constant volumetric flow are accordingly accompanied by variations from said constant speed of cam 58 in order to trace the resulting curve 16.

The output shaft 60 from the gear reducer 62 driven from the volume motor 64 at a variable speed so as to trace the volume curve 16, as hereinabove indicated, is drivingly connected to the counter mechanism 14 through an integrator 74. Accordingly, the counter 14 will total the volume as reflected by the rotation of the motor 64 instantaneously varied however in accordance with volume fluctuations during the time period measured. It will also be recalled that the correction control lever 48 displaceable with the pressure tracing lever 36 through the link member 42, is connected by member 76 to the integrator 74 so as to vary the drive ratio thereof between the shaft 60 and the counter mechanism 14 in accordance with corrective displacements imported to the member 76. Accordingly, the number of rotations imparted to the counter mechanism 14 from the shaft 60 will be increased or decreased in accordance with the variations in the instantaneous pressure corresponding to the instantaneous variable volume increase being counted. Therefore, the counter mechanism 14 will indicate the total corrected flow volume of gas after a complete tracing of the curves 16 and 18 on the chart 12 has been made.

Referring now to FIGURES 1, 2 and 3, the construction of the flow meter as diagrammatically illustrated in FIGURE 4 will be observed. A base plate member 78 is therefore provided for mounting of the computer mechanism components in assembled relation. In FIGURE 3, it will be more clearly seen that the timing motor 20 for rotating the chart 12 is mounted at the rear end of the base plate 78, said motor having an output shaft 80 connected to the drive mechanism 22 which in turn is drivingly connected to the chart mounting disk member 82 by means of shaft 84.

The manual lever 44 which extends across the base plate 78 at one side thereof is pivotally mounted on the base plate 78 by post 86. The forward end of the lever 78 has a downwardly depending element 46 providing convenient means for grasping by the operator in order to pivotally displace the lever 44. The link member 42 is pivotally connected to the lever 44 adjacent to but spaced rearwardly from the post 86. Mounted on the link member 42 intermediate the ends thereof is the projecting arm 88 by means of which the link member 42 is connected through the pin and slot connection 90 to the pressure curve tracing lever 36 pivotally mounted on the base plate 78 by means of pivot post 94. The pressure curve tracing stylus member 32 is therefore connected to the rear end of the lever 36 and may thereby overlie the meter chart 12 for tracing the curve 18 thereon. It will be noted that the end of the link member 42 opposite the end to which it is connected to the lever 44, is pivotally connected to the control lever 48 which is spring biased to one position by a spring element 52. The forward end of the lever 48 is pivotally connected to the control rod member 76 while the rear end of the lever 48 is pivotally mounted with respect to the base plate 78 by means of the pivot mounting member 96 mounted in spaced relation above the base plate 78 by a pair of post members 98.

The volume curve 16 on the chart 12 is traced by the volume tracing stylus 30 which is adjustably mounted on an upwardly projecting arm 100 which is connected to the lateral extension 102 from the lever 34 which is pivotally mounted on the pivot mounting plate 96 by means of pivot post 104. As more clearly seen in FIGURE 7, the follower arm 54 which is connected to the forward end of the lever 34 has rotatably mounted in the end thereof the follower element 56. A spring element 106 connected at one end to the frame by post 108 and to the other end to the remote end of the follower arm 54 biases the follower element 56 into engagement with the heart-shaped cam element member 58 as more clearly seen in FIGURE 7. Accordingly, upon rotation of the cam element 58 the arm 54 will be reciprocated to as to cause oscillation of the lever 34 to which it is connected and hence cyclic displacement of the volume tracing stylus 30.

The reference volume motor 64 is therefore mounted on one side of the base plate by means of the mounting bracket 110. Also mounted adjacent thereto by a mounting bracket 112 is the right angled drive mechanism 66 into which the motor shaft 114 from the motor 64 extends. The shaft 68 coupled to the output of the drive mechanism 66 is drivingly connected to the gear reducer mechanism 62. The output shaft 60 extends from one side of the gear reducer mechanism 62 for connection to the cam member 58 as seen in FIGURE 3 while from the other side thereof the shaft 60 is coupled to drive the integrator mechanism 74.

In order to control the speed of the motor 64 as herebefore indicated, the rheostat mechanism 70 is provided on one side and to the rear of the base plate 78. The rheostat control lever 72 is therefore pivotally connected to the base plate 78 by means of the post 116, said lever being spring-biased upwardly by means of the spring element 118. The forward end of the lever 72 has an element 120 connected thereto and depending downwardly therefrom for easy grasping by the operator. Intermediate the ends of the lever 72 a pivotally mounted rheostat actuator member 122 is contacted in order to actuate the rheostat. Referring therefore to FIGURE 5 in particular, it will be observed that the actuator member 122 has pivotally connected thereto the elements 124 in order to provide a movable contact element 126 for cooperation with the rheostat coil 128, in a manner well known to the art. Accordingly, the resistance of the circuit to the electric motor 64 may be varied in order to control the speed thereof.

It will be recalled that the integrator 74 to which the output shaft 60 from the gear reducer 62 extends, drivingly connects the shaft 60 to the counter mechanism 14. The output from the integrator 74 has therefore connected thereto the gear member 130 as more clearly seen in FIGURE 2. The gear 132 meshes with the gear 130 and is fixed to a shaft 134 which has a pinion gear 136 connected to the opposite end thereof for driving connection to the counter mechanism 14 by means of gearing 138. Mounting brackets 140 are provided for mounting the integrator 74 while mounting bracket 142 is provided for mounting the counter mechanism 14 on the base plate 78. Referring now to FIGURE 6 in particular, it will be observed that the integrator 74 is of the ball and disk type wherein a friction disk member 144 is connected to the end of the shaft 60. The output shaft 146 of the integrator 74 is connected to a friction roller cylinder 148 which is drivingly related to the input disk 144 by means of the friction roller element 158 rotatably mounted in the cage element 160 for shifting thereof by means of the control rod 76 to which the cage element 160 is connected. It will therefore be apparent that upon shifting of the cage element 160 and the roller transmitting element 158 therein, the drive ratio between the input disk 144 and the output roller member 148 may be varied. The counter mechanism 14 drivingly connected to the output shaft 146 of the integrator 74 will therefore provide a count of revolutions proportional to the rotation of the output shaft 146 of the integrator 74 which in turn will reflect the number of rotations of the volume motor 64, as corrected by the displacement of the pressure tracing lever which causes the drive ratio of the integrator 74 to change in accordance therewith. The displacement of the volume tracing lever on the other hand in order to reflect variations in the volumetric displacement of the flow meter will also change the number of rotations of the volume motor 64 to also provide the proper count to the counter mechanism 14 through the integrator 74.

From the foregoing description, both the principles of operation and the construction of the computer mechanism of this invention will be apparent. It will therefore be understood that the operator of the computer mechanism need only place the flow meter chart 12 on the disk 82 and start rotation of the motor 20. By manipulating the manual lever 44, the stylus member 32 may trace the static pressure curve 18 moving therebelow on the meter chart 12. Simultaneous therewith, the operator may manipulate the rheostat control lever 72 in order to vary the rotational speed of the motor 64 causing cyclic displacement of the volume tracing stylus member 30 so that the volume curve 16 may be traced thereby. The counter mechanism measuring the varying rotational movement of the volume motor 64 through the integrator 74 will therefore indicate the total gas flow volume. By varying the drive ratio of the integrator 74 in accordance with the displacement of the static pressure tracing lever 48, the counter mechanism 14 will reflect the total volume corrected for variation in the static pressure. Thus, variations in volumetric flow recorded as a function of time is converted into variations in rate of angular displacement of a variable rotational input with respect to time while the corresponding variation in static pressure as a function of time is converted into a variable linear displacement input with respect to time. Both of said variable inputs are then integrated with respect to time in order to obtain a corrected volumetric flow volume for a given time period.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A flow volume computer for a volume-pressure meter record comprising, reference means for producing movement representing a reference rate of flow, record tracing means operatively connected to the reference means for varying said movement thereof in accordance with deviations in volumetric rate of flow from said reference rate of flow as depicted on the meter record, totalling means for measuring output displacement, integrating means operatively connecting the reference means to the totalling means to indicate total displacement of the reference means, and corrective tracing means operatively connected to the integrating means to vary said total displacement indicated by the totalling means in accordance with static pressure variations as depicted on the meter record.

2. The combination of claim 1 including timer means connected to the meter record for displacement thereof at a constant rate with respect to which the meter record is calibrated and the tracing means movable.

3. The combination of claim 1 wherein said tracing means includes lever mounted styli for respectively tracing volume and static pressure curves on the meter record as the meter record is constantly displaced relative to the tracing means.

4. The combination of claim 3 wherein said reference means is drivingly connected to the integrating means and operatively connected to one of the tracing styli.

5. The combination of claim 4 wherein one of the tracing means includes speed control means operatively connected to the reference means for varying the speed thereof.

6. A flow volume computer comprising, constant speed meter chart rotating means, volume tracing means and static pressure tracing means for respectively tracing volume and pressure curves on a meter chart mounted on the chart rotating means, manual means operatively connected to the pressure tracing means for displacement thereof, volume motor means, cam means operatively connecting the motor means to the volume tracing means for variable displacement of the volume tracing means, rheostat speed control means operatively connected to the motor means for controlled variation in the speed of the cam means to displace the volume tracing means for tracing said volume curve, volume totalling counter means for measuring displacement of the volume motor means, integrating means drivingly connecting said volume motor means to the counter means and means operatively connecting the pressure tracing means to the integrating means for varying the drive ratio thereof in response to corrective displacement of the pressure tracing means.

7. In combination with a chart having curves representing variable functions of time, a data correcting computer comprising, timing means for continuously displacing said chart as a constant function of time, means for tracing one of said curves on said chart to convert the variable function of time represented thereby into an instantaneous corrective displacement, continuous displacing means operative to approximately trace another of said curves on the chart to convert the variable function of time represented thereby into a continuous variable displacement, control means operatively connected to said continuous displacing means for varying the rate of displacement thereof to render the continuous displacing means operative to trace said other curve, and integrating means operatively connected to the continuous displacing means and said means for tracing one of the curves to integrate with respect to time variable displacement of said continuous displacing means correctively varied in displacement rate as a function of said instantaneous corrective displacement.

8. The combination of claim 7, wherein said continuous displacing means includes curve tracing means, cam means operatively connected to said tracing means for continuous cyclic displacement thereof in proportion to a cyclically varying quantity represented by said other curve on the chart.

References Cited by the Examiner

UNITED STATES PATENTS

| | | | |
|---|---|---|---|
| 2,212,652 | 8/40 | Spitzglass et al. | 235—61 |
| 2,773,642 | 12/56 | McGay | 235—61 |

MALCOLM A. MORRISON, *Primary Examiner.*

WALTER W. BURNS, JR., *Examiner.*